United States Patent
Heffernan et al.

(10) Patent No.: US 10,366,404 B2
(45) Date of Patent: Jul. 30, 2019

(54) METHODS AND APPARATUS TO GROUP ADVERTISEMENTS BY ADVERTISEMENT CAMPAIGN

(71) Applicant: The Nielsen Company (US), LLC, New York, NY (US)

(72) Inventors: Ronan Heffernan, Wesley Chapel, FL (US); Chad A. Hage, Clearwater, FL (US); Ayaz Hemani, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 575 days.

(21) Appl. No.: 14/988,273

(22) Filed: Jan. 5, 2016

(65) Prior Publication Data
US 2017/0076316 A1 Mar. 16, 2017

Related U.S. Application Data

(60) Provisional application No. 62/216,480, filed on Sep. 10, 2015.

(51) Int. Cl.
*G06Q 30/00* (2012.01)
*G06Q 30/02* (2012.01)
(Continued)

(52) U.S. Cl.
CPC ....... *G06Q 30/0241* (2013.01); *G06K 9/4652* (2013.01); *G06K 9/6215* (2013.01); *G06K 9/6267* (2013.01)

(58) Field of Classification Search
None
See application file for complete search history.

(56) References Cited

U.S. PATENT DOCUMENTS

| 4,653,109 A | 3/1987 | Lemelson et al. |
| 5,592,569 A | 1/1997 | Li |

(Continued)

FOREIGN PATENT DOCUMENTS

| EP | 2375361 | 10/2011 |
| WO | 2008034001 | 3/2008 |

OTHER PUBLICATIONS

Chakravarti et al., "A Study of Color Histogram Based Image Retrieval," 2009 Sixth International Conference on Information Technology: New Generations, Apr. 27-29, 2009, retrieved from <ieeexplore.org>, retrieved on May 10, 2010 (6 pages).

(Continued)

*Primary Examiner* — Matthew T Sittner
(74) *Attorney, Agent, or Firm* — Hanley, Flight & Zimmerman, LLC

(57) ABSTRACT

A disclosed example method to group advertisements by advertisement campaign involves determining a first color proportion of a first color and a second color proportion of a second color in a first advertisement. The example method involves comparing first and second color proportions of the first advertisement to a third color proportion and a fourth color proportion of a second advertisement. The example method also involves associating the second advertisement with a same advertisement campaign of the first advertisement when a comparison between the first color proportion and the third color proportion satisfies a first threshold and a comparison between the second color proportion and the fourth color proportion satisfies a second threshold.

22 Claims, 8 Drawing Sheets

(51) Int. Cl.
 *G06K 9/46* (2006.01)
 *G06K 9/62* (2006.01)

(56) References Cited

U.S. PATENT DOCUMENTS

| | | | |
|---|---|---|---|
| 5,610,659 A | 3/1997 | Maturi et al. | |
| 5,850,472 A | 12/1998 | Alston et al. | |
| 6,031,607 A | 2/2000 | Miyazaki | |
| 6,111,984 A | 8/2000 | Fukasawa | |
| 6,154,567 A | 11/2000 | McGarry | |
| 6,295,374 B1 | 9/2001 | Robinson et al. | |
| 6,577,346 B1 | 6/2003 | Perlman | |
| 6,633,651 B1 | 10/2003 | Hirzalla et al. | |
| 7,020,336 B2 | 3/2006 | Cohen-Solal et al. | |
| 7,227,893 B1 | 6/2007 | Srinivasa et al. | |
| 7,274,825 B1 | 9/2007 | Lee et al. | |
| 7,558,429 B2 | 7/2009 | Lin et al. | |
| 7,912,852 B1* | 3/2011 | McElroy | G06Q 30/02 707/769 |
| 8,094,870 B2 | 1/2012 | Crookham et al. | |
| 8,117,071 B1 | 2/2012 | Fitch et al. | |
| 8,189,963 B2 | 5/2012 | Li et al. | |
| 8,229,210 B2 | 7/2012 | Rao | |
| 8,508,547 B2 | 8/2013 | Klassen et al. | |
| 8,526,718 B2 | 9/2013 | Rao | |
| 8,725,559 B1* | 5/2014 | Kothari | G06Q 90/00 705/14.1 |
| 8,873,642 B2 | 10/2014 | Vanderhoff et al. | |
| 2002/0041705 A1 | 4/2002 | Lin et al. | |
| 2003/0083850 A1 | 5/2003 | Schmidt et al. | |
| 2004/0189873 A1 | 9/2004 | Konig et al. | |
| 2005/0028188 A1* | 2/2005 | Latona | G06Q 30/02 725/13 |
| 2006/0153296 A1 | 7/2006 | Deng | |
| 2007/0070199 A1 | 3/2007 | Kung | |
| 2007/0230758 A1 | 10/2007 | Fan et al. | |
| 2008/0068622 A1 | 3/2008 | Deng et al. | |
| 2008/0178117 A1 | 7/2008 | Gelman et al. | |
| 2008/0205755 A1* | 8/2008 | Jackson | G06K 9/4652 382/168 |
| 2008/0225125 A1 | 9/2008 | Silverstein et al. | |
| 2009/0123025 A1 | 5/2009 | Deng et al. | |
| 2009/0125510 A1 | 5/2009 | Graham et al. | |
| 2009/0180698 A1 | 7/2009 | Ramani et al. | |
| 2009/0208097 A1 | 8/2009 | Husseini et al. | |
| 2010/0002774 A1 | 1/2010 | Kondo et al. | |
| 2010/0104177 A1* | 4/2010 | Homma | G06F 16/957 382/164 |
| 2010/0299202 A1* | 11/2010 | Li | G06Q 30/02 705/14.49 |
| 2010/0306043 A1 | 12/2010 | Lindsay et al. | |
| 2010/0310192 A1 | 12/2010 | Kuchibhotla et al. | |
| 2010/0318892 A1 | 12/2010 | Teevan et al. | |
| 2011/0050684 A1* | 3/2011 | Maegawa | A63F 13/61 345/419 |
| 2011/0145068 A1* | 6/2011 | King | G06F 17/211 705/14.55 |
| 2011/0197121 A1 | 8/2011 | Kletter | |
| 2011/0243459 A1 | 10/2011 | Deng | |
| 2011/0276946 A1 | 11/2011 | Pletter | |
| 2011/0316869 A1* | 12/2011 | Kariya | A63F 13/10 345/589 |
| 2012/0121019 A1 | 5/2012 | Sato | |
| 2012/0158954 A1* | 6/2012 | Heffernan | H04L 43/04 709/224 |
| 2012/0189066 A1 | 7/2012 | Kameyama et al. | |
| 2013/0114907 A1 | 5/2013 | Deng et al. | |
| 2013/0230256 A1 | 9/2013 | Deng | |
| 2013/0307956 A1* | 11/2013 | Hyde | H04N 7/181 348/78 |
| 2013/0339085 A1* | 12/2013 | Sadeh | G06Q 30/0255 705/7.29 |
| 2014/0006922 A1 | 1/2014 | Smith et al. | |
| 2014/0250360 A1 | 9/2014 | Jiang et al. | |
| 2014/0281872 A1 | 9/2014 | Glover | |
| 2015/0139558 A1* | 5/2015 | Nishiyama | G06F 16/583 382/220 |
| 2015/0227970 A1* | 8/2015 | Lee | G06Q 30/0254 705/14.52 |
| 2015/0302272 A1 | 10/2015 | Deng | |
| 2017/0076316 A1* | 3/2017 | Heffernan | G06Q 30/0241 |

OTHER PUBLICATIONS

European Patent Office, "European Search Report", issued in connection with European Patent Application No. 11002843.8, dated Oct. 30, 2014 (5 pages).

Radke et al., "Image Change Detection Algorithms: A Systematic Survey," IEEE Transactions on Image Processing, vol. 14, No. 3, Mar. 2005 (14 pages).

Radke et al., "Image Change Detection Algorithms: A Systematic Survey," Department of Electrical, Computer, and Systems Engineering, Renssalaer Polytechnic Institute, Aug. 19, 2004 (32 pages).

Hoad et al., "Video Similarity Detection for Digital Rights Management," Australian Computer Society, Inc., Twenty-Sixth Australasian Computer Science Conference, Adelaide, Australia, 2003 (9 pages).

"How the Change Detection Works," <http://ecocam.evsc.virginia.edu/change_detection_description/change_detection_description>, accessed on Jan. 20, 2010 (5 pages).

United States Patent and Trademark Office, "Office Action," issued in connection with U.S. Appl. No. 14/753,820, dated Aug. 25, 2015 (10 pages).

United States Patent and Trademark Office, "Notice of Allowance and Fee(s) Due," issued in connection with U.S. Appl. No. 14/753,820, dated Jan. 21, 2016 (16 pages).

United States Patent and Trademark Office, "Office Action," issued in connection with U.S. Appl. No. 12/754,361, dated Aug. 10, 2012 (12 pages).

United States Patent and Trademark Office, "Notice of Allowance", issued in connection with U.S. Appl. No. 13/867,765, dated Feb. 27, 2015 (13 pages).

United States Patent and Trademark Office, "Notice of Allowance," issued in connection with U.S. Appl. No. 12/754,361, dated Jan. 4, 2013 (8 pages).

* cited by examiner

METHODS AND APPARATUS TO GROUP ADVERTISEMENTS BY ADVERTISEMENT CAMPAIGN

CROSS REFERENCE TO RELATED APPLICATIONS

This patent claims priority to U.S. Provisional Patent Application No. 62/216,480, filed Sep. 10, 2015, entitled "Methods and apparatus to group advertisements by advertisement campaign", the entirety of which is hereby incorporated by reference.

FIELD OF THE DISCLOSURE

This disclosure relates generally to advertising, and, more particularly, to methods and apparatus to group advertisements by advertisement campaign

BACKGROUND

In recent years online advertising has had significant growth compared to traditional avenues of advertising, including television and radio. Some companies design online advertisements to promote certain brands or products in a suitable manner for online environments. In some cases, advertisements are designed as part of an overarching advertisement campaign. To increase the effectiveness of online advertising, a same idea or theme is sometimes used across numerous advertisements that are part of a same advertisement campaign

DETAILED DESCRIPTION

Figure 1:
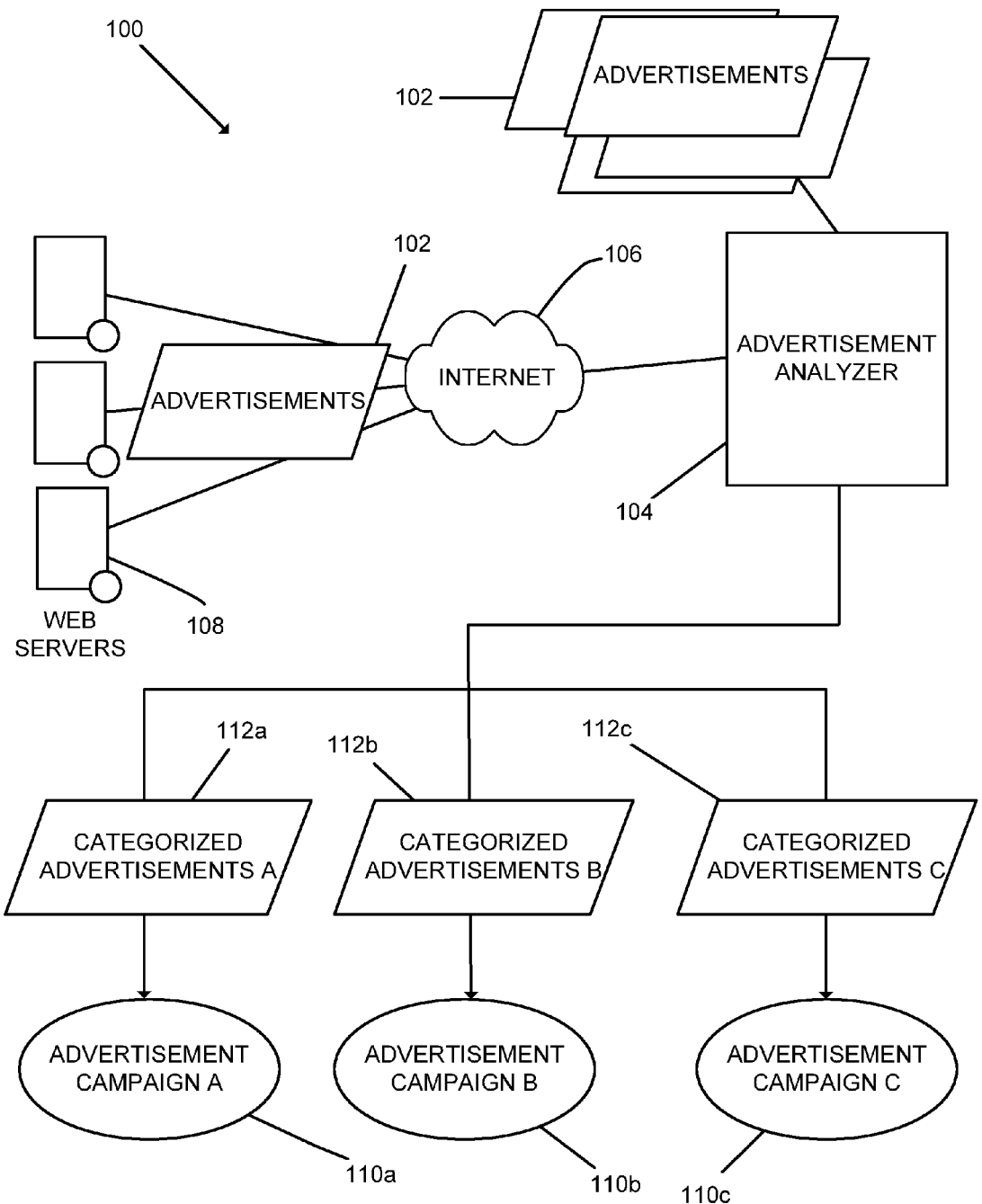
FIG. 1 is an example system for grouping advertisements into advertisement campaigns in accordance with the teachings of this disclosure.

Example methods, systems, and/or articles of manufacture disclosed herein enable grouping advertisements by advertisement campaign based on color characteristics of such advertisements.

Examples disclosed herein identify and categorize advertisements that belong to a same advertisement campaign by performing color palette analyses on advertisement images. For example, advertisements that are part of a same campaign may have a same overarching theme or design theme that uses similar color characteristics across all of the advertisements. By analyzing color characteristics across advertisement images, examples disclosed herein may be used to identify and categorize advertisements that belong to a same advertisement campaign even when languages and image sizes are different between the advertisements.

Example methods are disclosed herein to determine characteristics for use in grouping advertisements by advertisement campaign. In examples disclosed herein, a first advertisement image is obtained and proportions of colors relative to other colors in the image are determined. In some examples, the different color proportions of an advertisement image are representative of the color distribution or color histogram of the advertisement image. For example, color proportions of an advertisement image may be a 20% proportion for a first color, a 40% proportion for a second color, a 20% proportion for a third color, and a 20% proportion for a fourth color.

To determine the color proportions, examples disclosed herein involve performing palette analyses to obtain the red-green-blue (RGB) values of pixels in advertisement images. In some examples, the RGB values are rounded by dropping the least significant bit of each RGB value to group pixel color values into a pre-determined number of color groups. For example, least significant bits of color values for different shades of blue may be rounded to group the different shades of blue under a single blue color value. In some examples, different amounts of rounding for RGB values and different numbers of color groups may be used to achieve different levels of accuracy pertaining to identifying advertisements as belonging to particular advertisement campaigns.

In examples disclosed herein, the first advertisement image is a reference advertisement image, and its color proportions are used as reference color proportions that subsequently analyzed advertisements must sufficiently match to be deemed as being part of the same advertisement campaign as the reference advertisement image. For example, a palette analysis is performed on a subsequent, second advertisement image to determine color proportions of the second advertisement image. In such examples, the color proportions of the second advertisement image are compared to the color proportions of the reference advertisement image. In such examples, if the color proportions of the reference image and the second advertisement image are sufficiently similar, the second advertisement image is identified as being associated with the same advertisement campaign as the reference advertisement image.

For example, color proportions for a particular color present in both the reference image and the second advertisement image are sufficiently similar if a color proportion for that color of the reference advertisement image matches a color proportion for the same color of the second advertisement image within a threshold. In such examples, the threshold is selected to identify images belonging to a same advertisement campaign despite some differences in the color proportions between different advertisement images. For example, a red proportion of the second image may be ±2% of the red proportion of the reference image. In some examples, threshold values may be defined or selected to achieve different levels of performance or accuracy in identifying advertisements corresponding to particular advertisement campaigns. In some examples, advertisement images are categorized to an advertisement campaign and tagged with corresponding metadata to identify the advertisement images as corresponding to particular advertisement campaigns.

Use of color proportions, as disclosed herein, facilitates analyzing advertisements of different sizes for grouping into corresponding advertisement campaigns because examples disclosed herein use relative color proportions rather than other features that may be affected by differences in image size. Additionally, palette analysis examples disclosed herein are useful to analyze advertisements containing text in different languages because color proportions can be measured and analyzed independent of written languages appearing in the advertisements.

Some examples disclosed herein involve determining a first color proportion of a first color in a first advertisement and a second color proportion of a second color in the first advertisement (e.g., a reference advertisement). In such examples, the first color proportion and the second color proportion of the first advertisement are compared to a third color proportion and a fourth color proportion of a second advertisement (e.g., a candidate advertisement). In such examples, the second advertisement is associated with a same advertisement campaign of the first advertisement when a similarity between the first color proportion and the third color proportion satisfies a first threshold (e.g., a first color proportion range threshold), and when a similarity between the second color proportion and the fourth color proportion satisfies a second threshold (e.g., a second color proportion range threshold).

An example threshold is a color proportion range threshold. The color proportion range threshold is defined as an acceptable difference between a color proportion value and another color proportion value to indicate a match between the color proportions. In some examples, the first threshold defines a color proportion value tolerance amount different than the second threshold. In some examples, the first color of the first color proportion sufficiently matches a color of the third color proportion within a color range threshold and the second color of the second color proportion sufficiently matches a color of the fourth color proportion within the color range threshold. In some examples, the color range threshold defines a difference between a first color bit value and a second color bit value as being similar.

Some examples disclosed herein involve detecting a plurality of colors in the first advertisement (e.g., a reference advertisement). In some examples, a subset of the plurality of colors is selected based on the subset of the colors having relatively higher proportions of presence in the first advertisement than others of the plurality of colors. In such examples, the first color proportion and the second color proportion correspond to two respective colors of the subset of colors. Some examples also involve associating the first and second advertisements with a same advertisement campaign when a threshold number of color proportions in the selected subset of the plurality of colors detected in the first advertisement sufficiently match a number of corresponding color proportions of the second advertisement within at least one of the first threshold or the second threshold such as a color proportion range threshold. In such examples, the first threshold and the second threshold specify that a color proportion of a color of the selected subset of the plurality of colors in the first advertisement is within a range of a color proportion of a corresponding color of the second advertisement.

Example apparatus to group advertisements by advertisement campaign disclosed herein include an example color proportion generator, an example comparator, and an example associator. In examples disclosed herein, the color proportion generator determines a first color proportion of a first color and a second color proportion of a second color in a first advertisement (e.g., a reference advertisement). In disclosed examples, the comparator compares the first color proportion and the second color proportions of the first advertisement to a third color proportion and a fourth color proportion of a second advertisement. In examples disclosed herein, the associator associates the second advertisement with a same advertisement campaign of the first advertisement when a similarity between the first color proportion and the third color proportion satisfies a first threshold (e.g., a first color proportion range threshold) and a similarity between the second color proportion and the fourth color proportion satisfies a second threshold (e.g., a second color proportion range threshold). Some example apparatus include a color analyzer to detect a plurality of colors in the first advertisement and to select a subset of the plurality of colors based on the subset of the colors having relatively higher proportions of presence in the first advertisement than others of the plurality of colors in the first advertisement. In some such examples, the first color proportion and the second color proportion of the first advertisement correspond to two respective colors of the subset of colors. Some example apparatus include an associator to associate the first and second advertisements with a same advertisement campaign when a threshold number of color proportions in the selected subset of the plurality of colors detected in the first advertisement sufficiently match corresponding color proportions of the second advertisement within at least one of the first threshold or the second threshold. In some examples, the associator tags the second advertisement with metadata including an advertisement campaign identifier.

Disclosed example articles of manufacture include instructions that, when executed, cause a computing device to at least determine a first color proportion of a first color and a second color proportion of a second color in a first advertisement (e.g., a reference advertisement). In examples disclosed herein, the instructions cause the computing device to compare the first color proportion and the second color proportion of the first advertisement to a third color proportion and a fourth color proportion of a second advertisement. In examples disclosed herein, the instructions further cause the computing device to associate the second advertisement with a same advertisement campaign of the first advertisement when a similarity between the first color proportion and the third color proportion satisfies a first threshold (e.g., a first color proportion range threshold) and a similarity between the second color proportion and the fourth color proportion satisfies a second threshold (e.g., a second color proportion range threshold). In some examples, the instructions further cause the computing device to tag the second advertisement with metadata including an advertisement campaign identifier.

In examples disclosed herein, the instructions further cause the computing device to detect a plurality of colors in the first advertisement and to select a subset of the plurality of colors based on the subset of the colors having relatively higher proportions of presence in the first advertisement than others of the plurality of colors of the first advertisement. In some such examples, the first color proportion and the second color proportion correspond to two respective colors of the subset of colors. In some disclosed examples, the instructions cause the computing device to associate the first and second advertisements with a same advertisement campaign when a threshold number of color proportions in the selected subset of the plurality of colors detected in the first advertisement sufficiently match corresponding color proportions of the second advertisement within at least one of the first threshold or the second threshold.

Turning to the figures, FIG. 1 shows an example system 100 for grouping advertisements 102 into advertisement campaigns 110a-c. The example system 100 includes an example advertisement analyzer 104 to identify characteristics of the advertisements 102 that are to be categorized such as, for example, advertisement colors and proportions of colors. In the illustrated example, the example advertisement analyzer 104 may directly receive advertisements 102 to be categorized and/or obtain advertisements 102 to be categorized via the Internet 106 from a plurality of example web servers 110. In some examples, the advertisements 102 to be categorized may be stored on a removable storage device and received directly by the advertisement analyzer 104.

The example advertisements 102 include graphics and/or text to advertise media, organizations, products, and/or services. In the illustrated example, the advertisements 102 to be categorized are digital media that may be distributed using online Internet servers and/or broadcast sources, such as cable and/or satellite television delivery systems. The example advertisements 102 served by the web servers 110 may include any type of advertisement that may be presented via a web browser or app through, for example, a static image, flash media, and/or video. In some examples, the advertisements 102 to be categorized may include digital images of advertisements distributed in print media such as newspapers and magazines.

Figure 2:
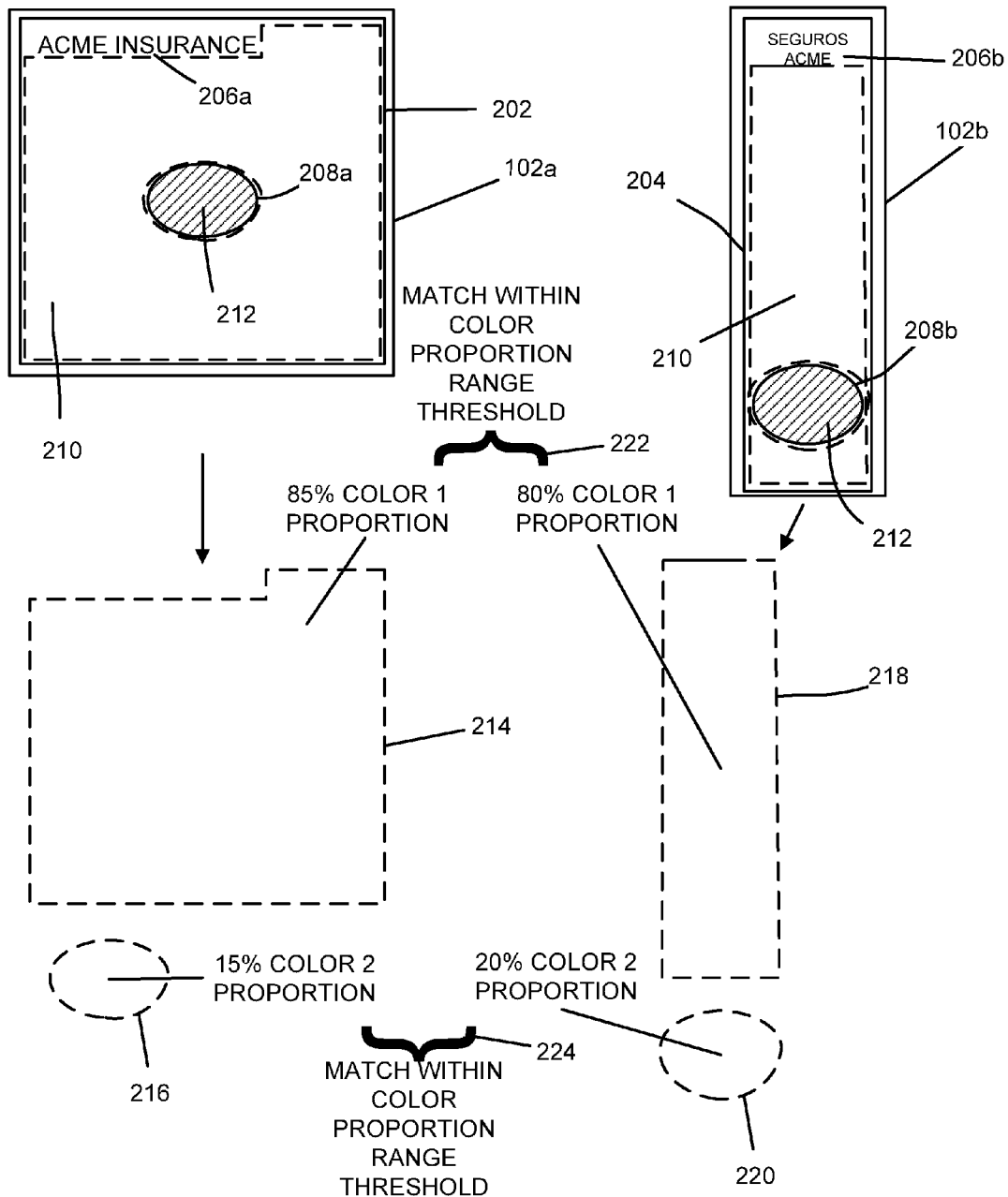
FIG. 2 shows example advertisements that the example advertisement analyzer of FIG. 1 identifies as being part of a same advertisement campaign.

In some examples, different ones of the advertisements 102 may belong to corresponding ones of the example advertisement campaigns 110a-c. Ones of the advertisements 102 belonging to a same advertisement campaign 110a-c share the same or similar features. The example advertisement analyzer 104 identifies advertisements 102 sharing the same or similar features to identify the advertisements 102 as corresponding to ones of the example advertisement campaigns 110a-c. In the illustrated example, the advertisements 102 corresponding to ones of the advertisement campaigns 110a-c are categorized by the advertisement analyzer 104 as categorized advertisements 112a-c. In examples disclosed herein, the advertisement analyzer 104 analyzes advertisements by comparing color proportions across different advertisement images to identify advertisements that are part of a same advertisement campaign 110a-c. In this manner, the example advertisement analyzer 104 analyzes the advertisements 102 and associates the categorized advertisements 112a-c resulting from the analysis with example advertisement campaigns 110a-c. For example, for each advertisement campaign 110a-c, corresponding ones of the categorized advertisements 112a-c have a common theme or design that is observable using example color proportion analysis techniques disclosed herein. Using such a shared theme or design, advertisements of the same campaign can be presented over the Internet across different websites to create awareness and/or interest in the subject matter of the same corresponding example advertisement campaign 110a-c. FIG. 2 illustrates an example first advertisement 102a and an example second advertisement 102b that the example advertisement analyzer 104 analyzes and associates with a same advertisement campaign (e.g., one of the advertisement campaigns 110a-c of FIG. 1). The example first advertisement 102a and the example second advertisement 102b are examples of advertisements 102 to be categorized. In the illustrated example, the first advertisement 102a and the second advertisement 102b are received directly by the advertisement analyzer 104 and/or obtained from one of the example web servers 110 via the Internet 106.

In the illustrated example, the first advertisement 102a includes an example first advertisement image 202 and the second advertisement 102b includes an example second advertisement image 204. In some examples, the first advertisement 102a and the second advertisement 102b may be different advertisement types and/or may originate from different sources. For example, the first advertisement 102a may be a static image advertisement type that is provided by an ad server and the second advertisement 102b may be a video advertisement type that is provided by a video streaming service server. In the illustrated example of FIG. 2, although the first advertisement 102a and the second advertisement 102b are part of the same advertisement campaign, the corresponding advertisement images 202 and 204 are of different dimensions and contain differently located text 206a and 206b and visual features such as, for example, buttons 208a and 208b. In some examples, the first advertisement image 202 and the second advertisement image 204 may include different quantities of and/or types of features. Although the illustrated example of FIG. 2 is described in connection with the first advertisement image 202 and the second advertisement image 204 being of different dimensions, examples disclosed herein may be used in connection with advertisements of the same dimensions. Some examples disclosed herein may be used in examples in which the text 208a of the first advertisement image 202 is in a different language than the text 208b of the second advertisement image 204. In the illustrated example, the text 206b is in Spanish while the text 206a is in English. Although the first advertisement 102a includes text 206a in English and the second advertisement 102b includes text 206b in Spanish, examples disclosed herein may be used to categorize the advertisements 102a, 102b into advertisement campaigns.

In the illustrated example of FIG. 2, the first advertisement image 202 and the second advertisement image 204 include a first color 210 and a second color 212. In the illustrated example, the advertisement analyzer 104 determines a first color proportion 214 corresponding to the first color 210 in the first advertisement image 202 and determines a second color proportion 216 corresponding to the second color 212 in the first advertisement image 202. The example advertisement analyzer 104 also determines a third color proportion 218 corresponding to the first color 210 in the second advertisement image 204 and a fourth color proportion 220 corresponding to the second color 212 in the second advertisement image 204. In the illustrated example, the color proportions 214, 216, 218, 220 are percentages or fractions of their corresponding colors 210, 212 relative to a total amount (e.g., total area) of other colors in corresponding ones of the advertisement images 202, 204. In other examples, the color proportions 214, 216, 218, 220 are percentages or fractions relative to a total size (e.g., a total area) of corresponding ones of the advertisement images 202, 204.

In the illustrated example, the advertisement analyzer 104 determines that a color value (e.g., an RGB pixel color value) of the color proportions 214, 216 of the first advertisement image 202 sufficiently match (e.g., within a color range threshold) a color value (e.g., an RGB pixel color value) of the color proportions 218, 220 of the second advertisement image 204.

As used herein, a color range threshold defines a range of shades of a color that are sufficiently similar to a single, same color so that the numerous shades of color are processed or analyzed as the single, same color. For example, for a 24-bit color value represented by an RGB pixel color value of 8:8:8 (e.g., an 8-bit red value, an 8-bit green value, and an 8-bit blue value) different shades of red are represented by varying the 8-bit red value between 0 and 255 (e.g., R:G:B=>0 . . . 255:0:0) which is the entire spectrum of the 8-bit binary value representing red. Similarly, different shades of green are represented by varying the 8-bit green value between 0 and 255 (e.g., R:G:B=>0:0 . . . 255:0). Similarly, different shades of blue are represented by varying the 8-bit blue value between 0 and 255 (e.g., R:G:B=>0:0:0 . . . 255).

Because color shades may differ slightly between advertisements corresponding to a same advertisement campaign, color range thresholds may be used to identify such slightly differing color shades as being sufficiently similar for use in color proportion comparisons disclosed herein. For example, the color range threshold of blue may be selected to specify an allowable color bit value variance of three such that shades of blue having bit values within three of a target shade of blue are considered as being the same color bit value as the target shade of blue.

Using such color range thresholding in the illustrated example, the advertisement analyzer 104 determines that a color value (e.g., an RGB pixel color value) of the first color proportion 214 of the first advertisement image 202 sufficiently matches (e.g., within a color range threshold) a color value of the third color proportion 218 of the second advertisement image 204. Also in the illustrated example, the advertisement analyzer 104 determines that a color value (e.g., an RGB pixel color value) of the second color proportion 216 of the first advertisement image 202 sufficiently matches (e.g., within a color range threshold) a color value of the fourth color proportion 220 of the second advertisement image 204.

After using the color range threshold technique to determine that the color proportions 214, 216 of the first advertisement image 202 and the color proportions 218, 220 of the second advertisement image 204 sufficiently correspond to respective colors, the example advertisement analyzer 104 compares color proportions of the first advertisement image 202 to corresponding color proportions of the second advertisement image 204. In the illustrated example, the example advertisement analyzer 104 compares the first color proportion 214 of the first advertisement image 202 with the third color proportion 218 of the second advertisement image 204 to determine whether the color proportions 214, 218 match within a first color proportion range threshold 222.

Also in the illustrated example, the example advertisement analyzer 104 compares the second color proportion 216 of the first advertisement image 202 with the fourth color proportion 220 of the second advertisement image 204 to determine whether the color proportions 216, 220 match within a second color proportion range threshold 224.

In the illustrated example, the first color proportion 222 and the second color proportion range threshold 224 define a color proportion value tolerance amount that indicates a sufficient similarity between color proportion values to indicate a match. For example, the first color proportion range threshold 222 may indicate that a blue color proportion value of the second advertisement image 204 that is within ±0.04 of a blue proportion value of the first advertisement image 202 is sufficiently similar to indicate a match between the blue color proportions of the first advertisement image 202 and the second advertisement image 204. In such examples, the second color proportion range threshold 224 likewise indicates a color proportion value tolerance amount for a color different than blue. In some examples, different color proportion range thresholds for different colors are defined. For example, the first color proportion range threshold for the first color 210 may indicate a than the second color proportion range threshold 224 for the second color 212.

Figure 3:
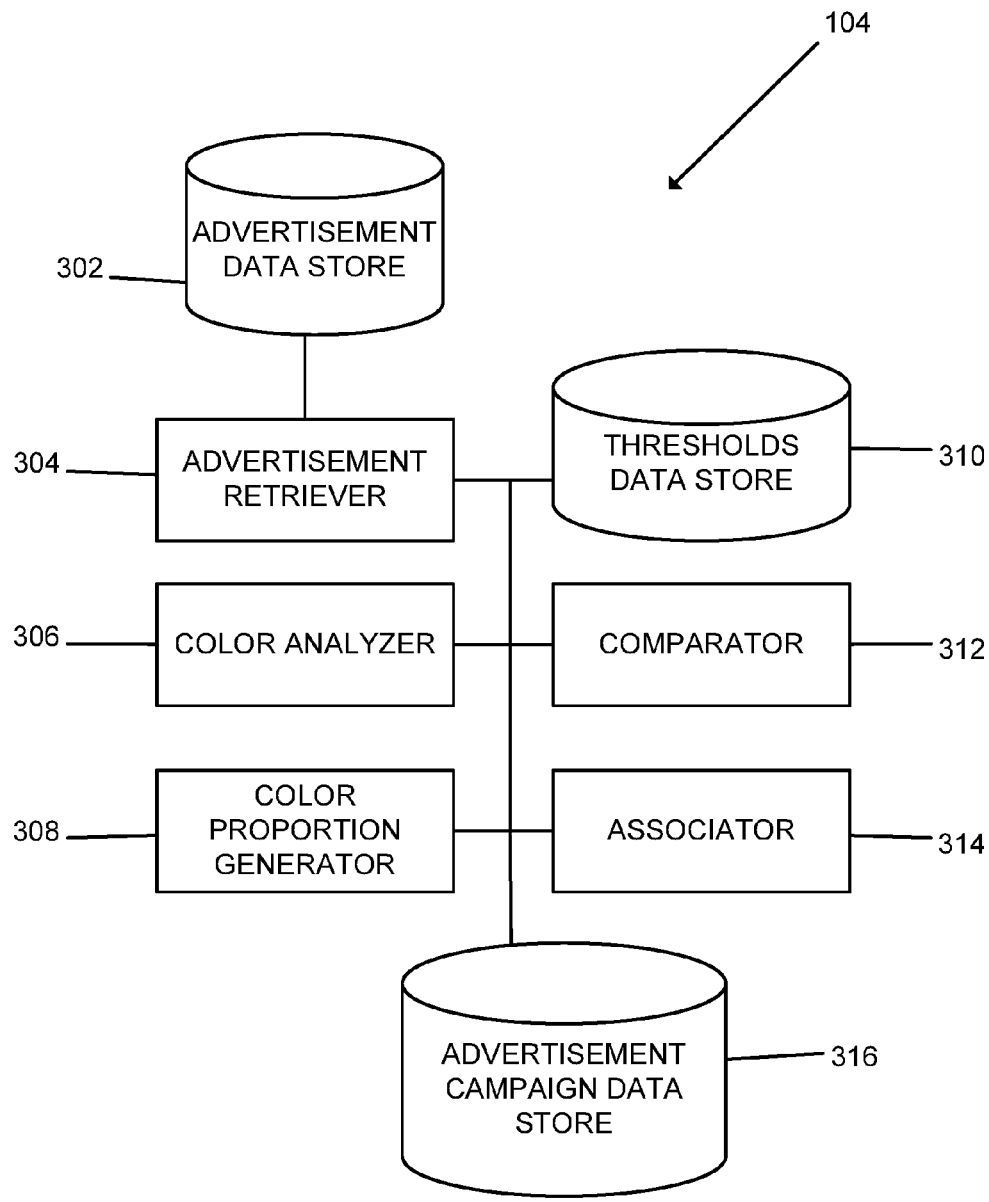
FIG. 3 is an example apparatus that may be used to implement the example advertisement analyzer of FIG. 1.

FIG. 3 is an example apparatus that may be used to implement the example advertisement analyzer 104 of FIG. 1. In the illustrated example, the advertisement analyzer 104 includes an example advertisement data store 302, an example advertisement retriever 304, an example color analyzer 306, an example color proportion generator 308, an example thresholds data store 310, an example comparator 312, an example associator 314, and an example advertisement campaign data store 316.

In the illustrated example, the advertisement analyzer 104 is provided with the advertisement data store 302 to store advertisements 102 to be categorized that are received directly by the advertisement analyzer 104 and/or obtained from the web servers 110 via the Internet 106. The advertisement data store 302 may be implemented using, for example, a file structure that stores electronic files, or a database. In the illustrated example, to retrieve the advertisements 102 to be categorized from the advertisement data store 302, the advertisement analyzer 104 is provided with the advertisement retriever 304. In the illustrated example, the advertisement analyzer 104 uses the advertisement retriever 304 to retrieve a first advertisement 102a and a second advertisement 102b from the advertisement data store 302. In some examples, the advertisement analyzer 104 does not include the advertisement data store 302 and instead the advertisement retriever 304 directly receives advertisements 102 and/or obtains advertisements 102 directly from the web servers 110 via the Internet 106.

In the illustrated example, to detect colors in the advertisements 102, the advertisement analyzer 104 is provided with the color analyzer 306. In the illustrated example, the color analyzer 306 detects colors (e.g., the first color 210 or the second color 212 of FIG. 2) by analyzing pixel color values of pixels of the advertisements 102. In the illustrated example, pixel color values correspond to a red color channel, a green color channel, and a blue color channel that are used in combination for each pixel to form a broad spectrum of colors (e.g., red-green-blue (RGB) values per pixel). In some examples, pixel color values also include hue-saturation-value (HSV) values and/or hue-saturation-lightness (HSL) values for further use in determining a quantitative representation of the pixel colors. In some examples, the color analyzer 306 groups similarly colored pixels into a group with one color value by dropping the least significant bits of each pixel color value such that, for example, different shades of blue are evaluated as a same, single blue value. In some examples, the number of least significant bits dropped by the color analyzer 306 is adjustable to vary the number of colors or range of color shades that are grouped into a same, single color value. In some examples, increasing the number of least significant bits dropped by the color analyzer 306 for pixel color values decreases computation time and processing resources required to analyze color proportions of advertisements but results in less accurate color detection. However, color detection accuracy can be increased by decreasing the number of least significant bits dropped for pixel color values. As such, the number of least significant bits to drop can be determined based on a desired level of accuracy performance in associating advertisements with corresponding advertisement campaigns balanced with processing speed and processing resource utilization to identify such advertisement campaign associations.

In the illustrated example, the color analyzer 306 detects a plurality of colors in the first advertisement image 202 (FIG. 2) by analyzing the pixel color values associated with pixels of the first advertisement image 202. The color analyzer 306 then outputs color pixel quantity values indicative of respective numbers of pixels corresponding to respective individual colors (e.g., the first color 210 and the second color 212). In some examples, the color analyzer 306 outputs a histogram indicative of the distribution of pixel color values within the first advertisement image 202. In some examples, the color analyzer 306 excludes certain colors from being used for color proportion comparison between images. For example, shades of black and/or white may be excluded to improve the accuracy of advertisement image comparison.

In the illustrated example, after the color analyzer 306 detects the plurality of colors in the first advertisement image 202, the color proportion generator 308 generates color proportions of the first advertisement image 202. In the illustrated example, the color proportion generator 308 receives the total number of pixels in the first advertisement image 202 and the number of pixels corresponding to each individual color of the first advertisement image 202. In the illustrated example, the color proportion generator 308 determines the color proportion values by dividing the number of pixels corresponding to individual colors (e.g., the first color 210 or the second color 212) by the total number of pixels of the first advertisement image 202. For example, if there are 500 pixels in the first advertisement image 202, and 250 pixels of the first advertisement image 202 are blue, the color proportion of blue for the first advertisement image 202 is 50% or 0.50. In the illustrated example, the color proportions determined by the color proportion generator 308 for the first advertisement image 202 may be associated with the first advertisement 102a as reference color proportions for an advertisement campaign (e.g., one of the advertisement campaigns 110a-c of FIG. 1). In some examples, a sub-section of the first advertisement image 202 may be analyzed to determine color proportions for the sub-section.

In the illustrated example, the advertisement analyzer 104 analyzes the second advertisement 102b in a similar manner as the first advertisement 102a. In the illustrated example, the color analyzer 306 detects a plurality of colors in the second advertisement image 204 (FIG. 2) by analyzing the pixel color values associated with pixels of the second advertisement image 204. The color analyzer 306 then outputs color pixel quantity values indicative of respective numbers of pixels for corresponding individual colors of the second advertisement image 204 (e.g., the first color 210 and the second color 212). In some examples, the color analyzer 306 outputs a histogram indicative of the distribution of pixel color values within the second advertisement image 204.

In the illustrated example, the color proportion generator 308 generates color proportions of the second advertisement image 204. In the illustrated example, the color proportion generator 308 receives the total number of pixels in the second advertisement image 204 and the color pixel quantity value corresponding to each individual color of the second advertisement image 204. In the illustrated example, for each color, the color proportion generator 308 determines the color proportion values by dividing the color pixel quantity value of that color (e.g., the first color 210 or the second color 212) by the total number of pixels of the second advertisement image 204.

In the illustrated example, to compare the advertisements 102 with each other, the advertisement analyzer 104 is provided with the comparator 312. In some examples, the comparator 312 compares advertisements 102 to be categorized with reference characteristics indicative of an advertisement campaign category. In the illustrated example, the comparator 312 selects and/or receives a subset of the plurality of colors detected by the color analyzer 306 based on the subset of the colors having relatively higher proportions of presence in the advertisement image (e.g., the first advertisement image 202) than others of the plurality of colors. For example, the comparator 312 may identify the top 50 colors with relatively higher color proportions out of all colors detected in the first advertisement image 202 (FIG. 2) to be the subset. In some examples, the subset of the plurality of colors is selected by sorting the color proportions of all the colors generated by the color proportion generator 308 for the first advertisement image 202 from largest to smallest and then selecting the top color proportions. In some examples, the size of the subset (e.g., the number of colors) of the plurality of colors detected by the color analyzer 306 is adjustable to increase or decrease the size of the subset. As such, the number of colors in the subset can be selected based on the level of desired comparison accuracy performance balanced with computation speed and processing resource utilization. Comparison accuracy is indicative of whether example color proportion analyses correctly associate a second advertisement 102b with the same advertisement campaign that an advertiser intended for the second advertisement 102b. A higher comparison accuracy means a large number of second advertisements 102b are correctly identified as part of a particular advertisement campaign (e.g., of the first advertisement 102a). A lower comparison accuracy means a large number of second advertisements 102b identified as belonging to a particular advertisement campaign (e.g., of the first advertisement 102a) do not actually correspond to the identified advertisement campaign. For example, if few colors are used in a subset, advertisements for a motorcycle may be incorrectly identified as part of an advertisement campaign for pancakes because the few color proportions of the advertisements that are compared are similar. Increasing the number of colors in the subset used for color proportion comparisons increases comparison accuracy but decreases computation speed because more time is spent comparing additional color proportions.

In the illustrated example, the comparator 312 retrieves color proportion values (e.g., color proportion values of the first advertisement 102a) of a selected color subset to compare with color proportion values of other colors in other advertisement images (e.g., color proportion values of the second advertisement 102b). For example, if the first color 210 and second color 212 (FIG. 2) are in the subset, the comparator 312 compares the first color proportion 214 (FIG. 2) of the first advertisement image 202 with the third color proportion 218 (FIG. 2) of the second advertisement image 204. In addition, the example comparator 312 compares the second color proportion 216 (FIG. 2) of the first advertisement image 202 with the fourth color proportion 220 (FIG. 2) of the second advertisement image 204. In the illustrated example, the comparator 312 outputs values representative of amounts of similarities (or differences) between the color proportions 214, 216, 218, 220 of corresponding colors of the advertisement images 202, 204 for the colors in the subset.

To determine whether the second advertisement 102b is part of the same advertisement campaign (e.g., one of the advertisement campaigns 110a-c) as the first advertisement 102a, the advertisement analyzer 104 is provided with the thresholds data store 310. In some examples, the thresholds data store 310 may be implemented using, for example, a look up table, a configuration file, or a database. In the illustrated example, the thresholds data store 310 stores thresholds, such as, for example, the first color proportion range threshold 222 and the second color proportion range 224 of FIG. 2, the color range threshold, and/or a number of matches threshold, for analyzing advertisement images 202, 204. In examples disclosed herein, a number of matches threshold defines a threshold number of color proportions to be matched between advertisement images 202, 204 that must be satisfied to confirm that the second advertisement 102b belongs to the advertisement campaign (e.g., one of the advertisement campaigns 110a-c) of the first advertisement 102a. In some examples, the first color proportion range threshold 222, the second color proportion range threshold 224 the threshold color range, or the number of matches threshold are unique to each advertisement campaign. In some examples, the thresholds for analyzing advertisement images are modifiable to adjust the degree of similarity between advertisements 102 and a first advertisement 102a needed to determine that an advertisement 102 is part of a particular advertisement campaign. For example, the number of candidate advertisements 102b that are confirmed as belonging to an advertisement campaign corresponding to the first advertisement 102a increases when the degrees of similarities required for a match are relaxed by increasing the first color proportion range threshold 222 and/or the second color proportion range threshold 224, increasing the color range threshold, and/or lowering the number of matches threshold.

In the illustrated example, the comparator 312 determines when a similarity (or difference) between the first color proportion 214 and the third color proportion 218 satisfies a first color proportion range threshold 222 and a similarity (or difference) between the second color proportion 216 and the fourth color proportion 220 satisfies a second color proportion range threshold 224. Referring to the example of FIG. 2, the example comparator 312 determines that the second advertisement 102b corresponds to the same advertisement campaign as the first advertisement 102a when the number of color proportions satisfying the respective color proportion range threshold 222, 224 satisfies the number of matches threshold. For example, if the number of matches threshold is 20, the example comparator 312 determines that the second advertisement 102b corresponds to the advertisement campaign of the first advertisement 102a if at least 20 of the color proportions of the second advertisement image 204 are sufficiently similar to 20 of the reference color proportions of the first advertisement image 202 within the respective color proportion range threshold 222, 224.

In the illustrated example, the advertisement analyzer 104 is provided with the associator 314 to associate advertisements 102 with corresponding advertisement campaigns (e.g., one of the advertisement campaigns 110a-c of FIG. 1). The advertisement analyzer 104 is also provided with the advertisement campaign data store 316 to store the categorized advertisements 112a-c in association with corresponding advertisement campaign identifiers, names, etc. In some examples, the advertisement campaign data store 316 may be implemented using, for example, a look up table, file structure that stores electronic files, and/or a database. In the illustrated example, the associator 314 tags categorized advertisements 112a-c by appending data indicating an advertisement campaign association to a file of each categorized advertisement 112a-c. In some such examples, the associator 314 tags the categorized advertisements 112a-c with metadata indicative of a particular advertisement campaign 110a-c. In some such examples, the metadata includes an advertisement campaign identifier (ID) that indicates the advertisement campaign to which the advertisement belongs to. In some examples, the associator 314 tags metadata to the first advertisement 102a that is known to belong to and/or is representative of a particular advertisement campaign. In some such examples, the associator 314 tags second advertisements 102b subsequently identified as sufficiently similar to the first advertisement 102a with the same metadata as the first advertisement 102a. Alternatively, the associator 314 may update the metadata tagged to the first advertisement 102a. In such examples, the updated metadata identifies the second advertisement 102b as belonging to the same advertisement campaign as the first advertisement 102a. In the illustrated example, after the categorized advertisements 112a-c are associated with an advertisement campaign 110a-c and/or tagged with metadata indicating the association with a particular advertisement campaign 110a-c, the categorized advertisements 112a-c and tagged metadata are stored in the advertisement campaign data store 316. Alternatively, instead of storing the categorized advertisements 112a-c, the advertisement campaign data store 316 stores information indicating which categorized advertisements 112a-c correspond to which advertisement campaigns 110a-c.

While an example manner of implementing the advertisement analyzer 104 of FIG. 1 is illustrated in FIG. 3, one or more of the elements, processes and/or devices illustrated in FIG. 3 may be combined, divided, re-arranged, omitted, eliminated and/or implemented in any other way. Further, the example advertisement data store 302, the example advertisement retriever 304, the example color analyzer 306, the example color proportion generator 308, the example thresholds data store 310, the example comparator 312, the example associator 314, the example advertisement campaign data store 316, and/or, more generally, the example advertisement analyzer 104 of FIG. 1 may be implemented by hardware, software, firmware and/or any combination of hardware, software and/or firmware. Thus, for example, any of the example advertisement data store 302, the example advertisement retriever 304, the example color analyzer 306, the example color proportion generator 308, the example thresholds data store 310, the example comparator 312, the example associator 314, the example advertisement campaign data store 316, and/or, more generally, the example advertisement analyzer 104 could be implemented by one or more analog or digital circuit(s), logic circuits, programmable processor(s), application specific integrated circuit(s)

(ASIC(s)), programmable logic device(s) (PLD(s)) and/or field programmable logic device(s) (FPLD(s)). When reading any of the apparatus or system claims of this patent to cover a purely software and/or firmware implementation, at least one of the example advertisement data store 302, the example advertisement retriever 304, the example color analyzer 306, the example color proportion generator 308, the example thresholds data store 310, the example comparator 312, the example associator 314, the example advertisement campaign data store 316, and/or, more generally, the example advertisement analyzer 104 is/are hereby expressly defined to include a tangible computer readable storage device or storage disk such as a memory, a digital versatile disk (DVD), a compact disk (CD), a Blu-ray disk, etc. storing the software and/or firmware. Further still, the example advertisement analyzer 104 of FIG. 3 may include one or more elements, processes and/or devices in addition to, or instead of, those illustrated in FIG. 3, and/or may include more than one of any or all of the illustrated elements, processes and devices.

Figure 4:
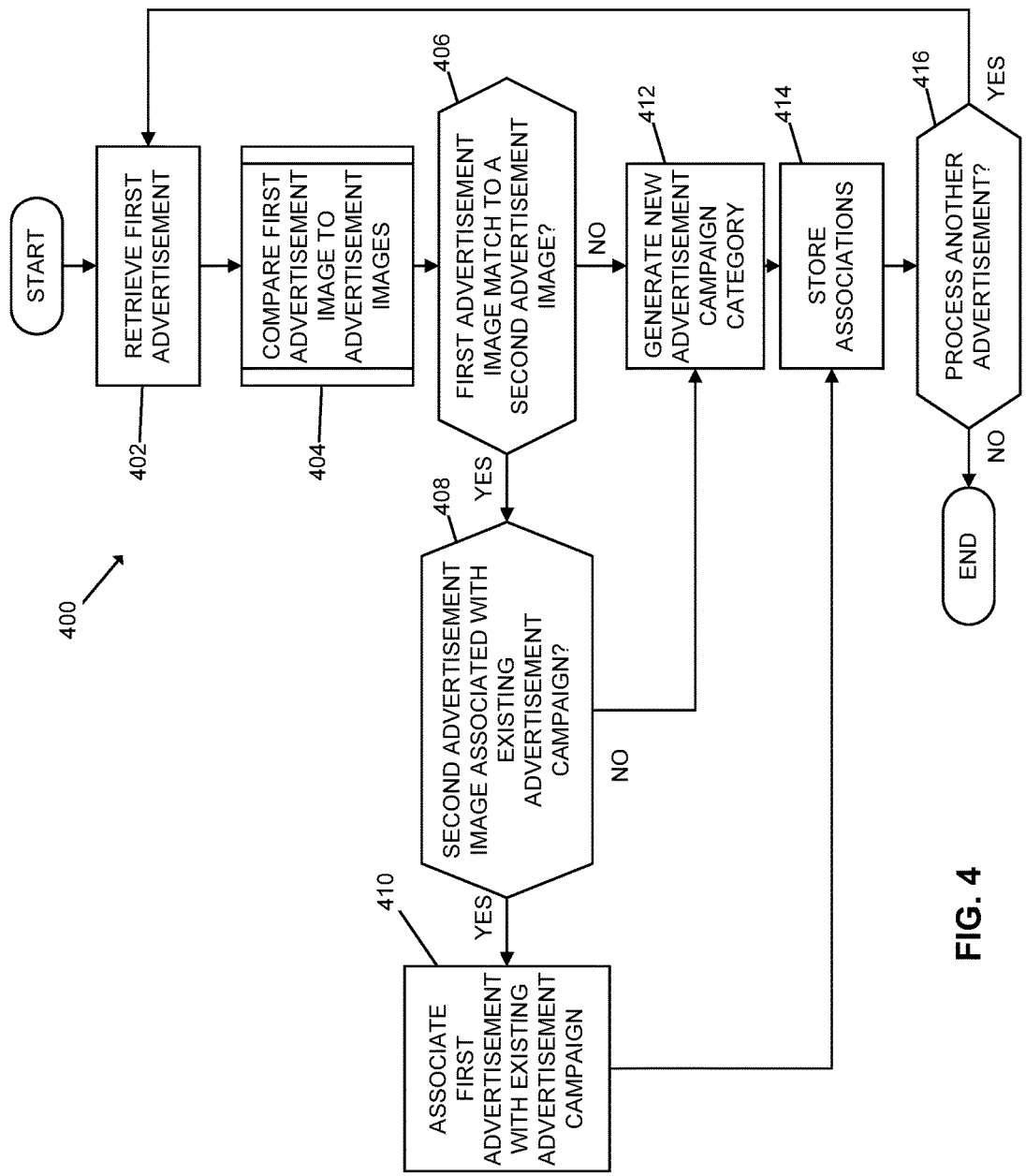
FIG. 4 is a flowchart representative of example machine readable instructions that may be executed to implement the example advertisement analyzer of FIGS. 1 and 3 to group advertisements by advertisement campaign.
Figure 5:
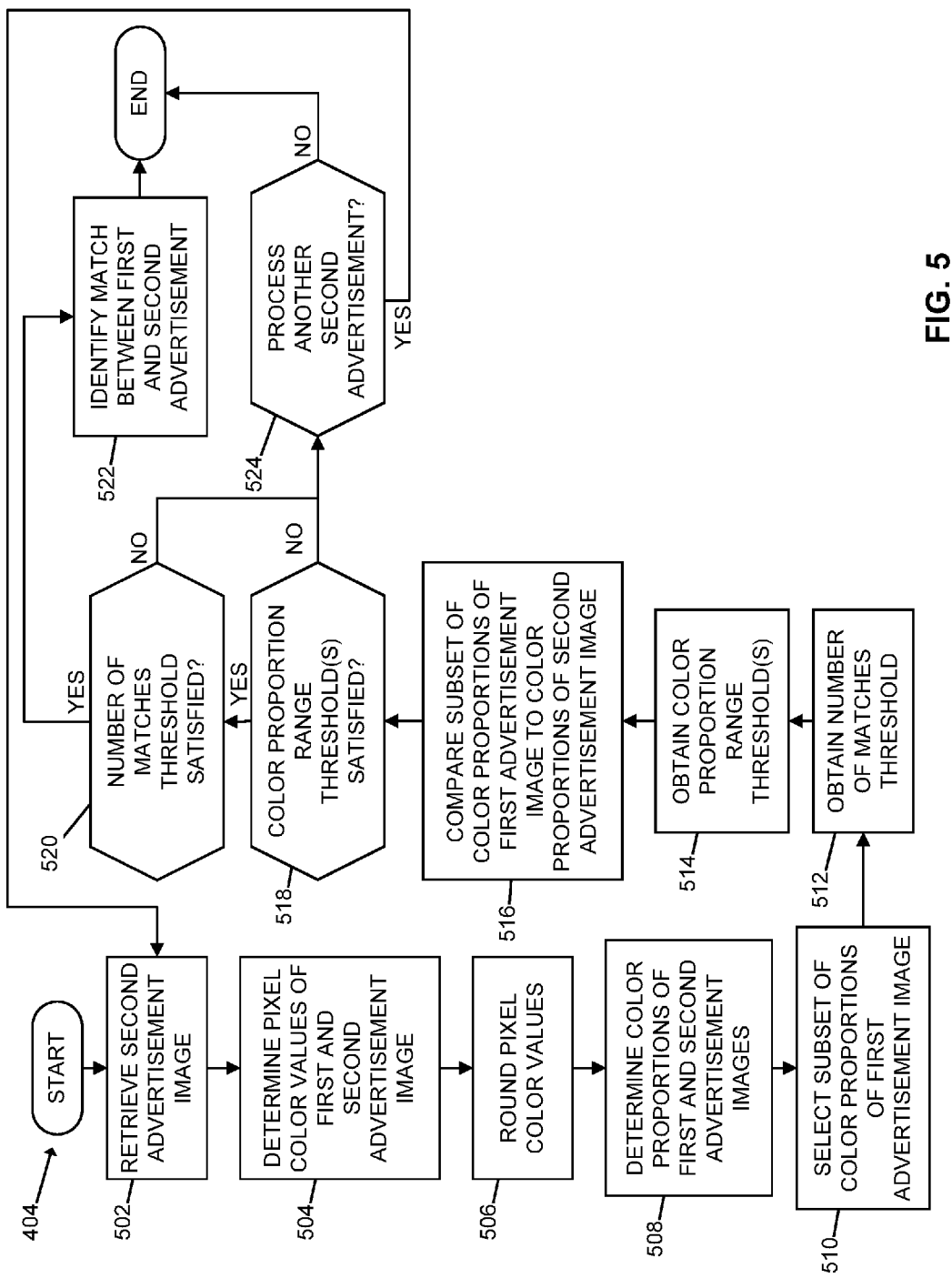
FIG. 5 is a flowchart representative of example machine readable instructions that may be executed to implement the example advertisement analyzer of FIGS. 1 and 3 to compare color proportions of advertisements.
Figure 6:
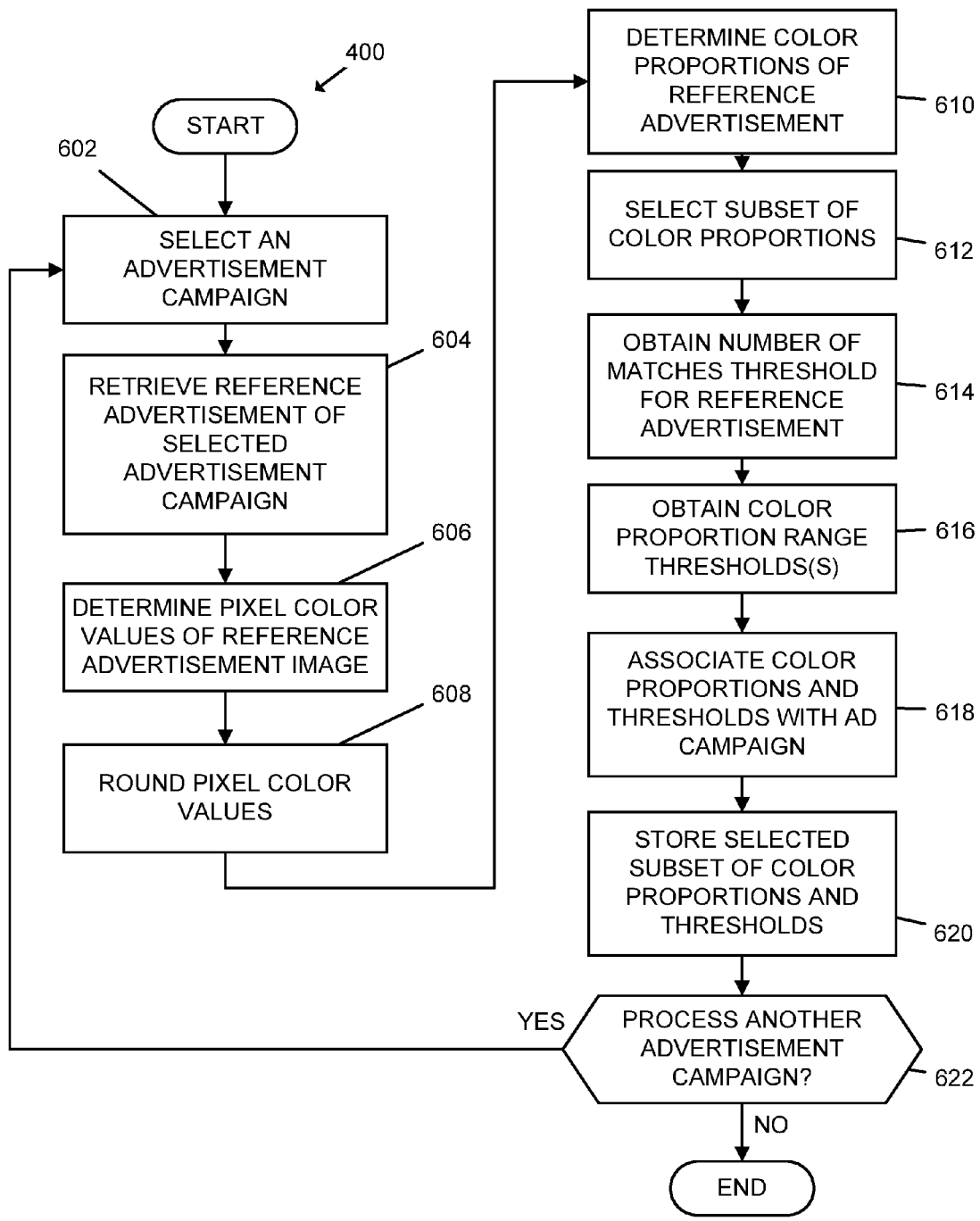
FIG. 6 is a flowchart representative of example machine readable instructions that may be executed to implement the example advertisement analyzer of FIGS. 1 and 3 to define color proportion thresholds to associate advertisements with advertisement campaigns.
Figure 7:
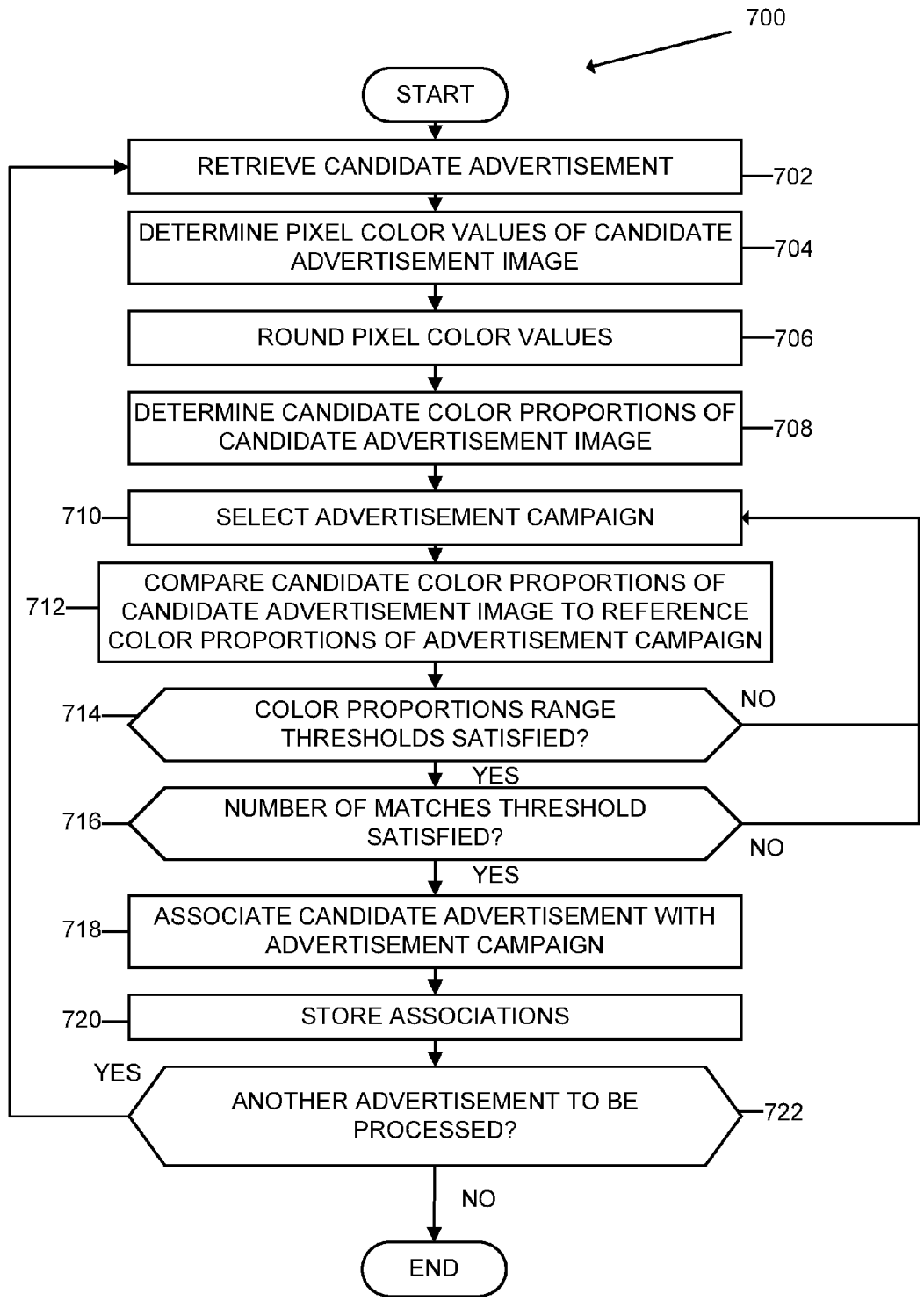
FIG. 7 is a flowchart representative of example machine readable instructions that may be executed to implement the example advertisement analyzer of FIGS. 1 and 3 to group advertisements by advertisement campaign.

Flowcharts representative of example machine readable instructions for implementing the advertisement analyzer 104 of FIG. 1 and FIG. 3 are shown in FIGS. 4, 5, 6, and 7. FIG. 4 is a flowchart representative of machine readable instructions that when executed, may be used to implement the example advertisement analyzer 104 of FIGS. 1 and 3 to group advertisements by advertisement campaign (e.g., one of the advertisement campaigns 110a-c). FIG. 5 is a flowchart representative of machine readable instructions that when executed, may be used to implement the example advertisement analyzer 104 of FIGS. 1 and 3 to compare color proportions of advertisements. FIG. 6 is a flowchart representative of machine readable instructions that when executed, may be used to implement the example advertisement analyzer 104 of FIGS. 1 and 3 to generate reference color proportions for an advertisement campaign (e.g., one of the advertisement campaigns 110a-c) and to define thresholds for an advertisement campaign during a reference data generation phase. FIG. 7 is a flowchart representative of machine readable instructions that when executed, may be used to implement the example advertisement analyzer 104 of FIGS. 1 and 3 to determine and compare color proportions of a second advertisement 102b (FIG. 1) during an advertisement comparison phase.

In the examples of FIGS. 4, 5, 6, and 7, the machine readable instructions may be used to implement programs for execution by a processor such as the processor 812 shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 4, 5, 6, and 7, many other methods of implementing the example advertisement analyzer 104 may alternatively be used. For example, the order of execution of the blocks may be changed, and/or some of the blocks described may be changed, eliminated, or combined.

As mentioned above, the example processes of FIGS. 4, 5, 6, and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 5, 6, and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning now to the illustrated example of FIG. 4, the advertisement retriever 304 retrieves a first advertisement, such as a first advertisement 102a (block 402). In the illustrated example, the advertisement retriever 304 may retrieve the first advertisement 102a from the advertisement data store 302 of FIG. 3. In some examples, the first advertisement 102a is received directly by the advertisement analyzer 104 and/or originates from a web server 110 via the Internet 106 and is stored in the advertisement data store 302.

In the illustrated example, the comparator 312 compares the first advertisement 102a to all advertisements (block 404). In the illustrated example, the advertisement analyzer 104 compares the first advertisement 102a to other advertisements according to process 404 (FIG. 5) described in further detail below. In the illustrated example, the first advertisement 102a is compared to other advertisements that may originate from the Internet 106, or the advertisement data store 302.

In the illustrated example, the example advertisement analyzer 104 determines whether the first advertisement image 202 sufficiently matches to a second advertisement image 204 (block 406). If the advertisement analyzer 104 determines that the first advertisement image 202 did not sufficiently match to a second advertisement image 204, the associator 314 generates a new advertisement campaign (block 412). In the illustrated example, the associator 314 generates a new advertisement campaign (e.g., one of the advertisement campaigns 110a-c of FIG. 1) by associating a new advertisement campaign ID with the first advertisement 102a.

In the illustrated example, if the example advertisement analyzer 104 determines that the first advertisement image 202 sufficiently matches with a second advertisement image 204, the example advertisement analyzer determines whether the second advertisement image 204 is associated with an existing advertisement campaign (block 408). For example, the advertisement analyzer 104 may access the advertisement campaign data store 316 to retrieve a look up table that includes advertisement campaigns and the advertisements associated with each advertisement campaign. The advertisement analyzer 104 checks the look up table to determine if the second advertisement image 204 is associated with an existing advertisement campaign. In some examples, the advertisement analyzer 104 looks for metadata tagged to the second advertisement image 204 to determine if the second advertisement 102b is associated with an existing advertisement campaign. If the advertisement analyzer 104 determines that the second advertisement image 204 is not associated with an existing advertisement campaign, the associator 314 generates a new advertisement campaign category (block 412). In the illustrated example, the associator 314 associates the new advertisement campaign category with the first advertisement 102a.

In the illustrated example, if the advertisement analyzer 104 determines that the second advertisement image 204 is associated with an existing advertisement campaign, the associator 314 associates the first advertisement 102a with the existing advertisement campaign associated with the second advertisement image 204 (block 410). For example, a sprinkled pancake advertisement campaign ID may be associated with the second advertisement 102b. In such an example, the associator 314 also associates the first advertisement 102a with the sprinkled pancake advertisement campaign ID.

In the illustrated example, the advertisement analyzer 104 stores associations in the advertisement campaign data store 316 (block 414). In the illustrated example, the associations stored in the advertisement campaign data store 316 include new advertisement campaign category associations generated by process 400 and/or associations with an existing advertisement campaigns. In some examples, the associations are stored as metadata tagged to the advertisements. In some examples, the associations are stored as a look up table in the advertisement campaign data store 316.

In the illustrated example, the advertisement analyzer 104 determines whether another advertisement is to be processed (block 416). If the advertisement analyzer 104 determines that another advertisement is to be processed, return controls to block 402. If the advertisement analyzer 104 determines that another advertisement is not to be processed, process 400 ends.

FIG. 5 illustrates an example process 404 to be implemented by the advertisement analyzer 104 to determine whether a first advertisement image 202 sufficiently matches a second advertisement image 204. In the illustrated example, the advertisement retriever 304 retrieves the second advertisement image 204 (block 502). In the illustrated example, the second advertisement image 204 may be retrieved from the Internet 106, or the advertisement data store 302.

In the illustrated example, the color analyzer 306 analyzes color properties of the first advertisement image 202 and the second advertisement image 204 to determine the proportions of colors in the first advertisement image 202 and the second advertisement image 204. For example, the color analyzer 306 determines pixel color values of the first advertisement image 202 and the second advertisement image 204 (block 504). The example color analyzer 306 rounds the pixel color values (block 506). For example, the color analyzer 306 rounds pixel color values of the first advertisement image 202 and the second advertisement image 204 by dropping a number of the least significant bits of each pixel color value such that, for example, numerous shades of colors are grouped into fewer color shades.

In the illustrated example, the color proportion generator 308 determines color proportions of the first advertisement image 202 and the second advertisement image 204 (block 508). For example, the color proportion generator 308 may identify the color proportions for the first advertisement image 202 as 20% red, 50% blue, 15% green, and 15% yellow.

In the illustrated example of FIG. 5, the color proportion generator 308 then selects a subset of the color proportions of the first advertisement image 202 (block 510). The selected subset is to be used to determine whether second advertisements 102b belong to the same advertisement campaign as the first advertisement 102a. In the illustrated example, the color proportions selected to be part of the subset have higher proportions of presence in the first advertisement image 202 relative to other color proportions of the plurality of colors in the first advertisement image 202. For example, the color analyzer 306 may detect 100 colors in the first advertisement image 202. In such examples, the comparator 312 may identify and select the top 50 colors of the first advertisement image 202 having the top 50 largest color proportions. In some examples, the color proportion generator 308 sorts the color proportions of the first advertisement image 202 from largest to smallest to determine the top colors of the first advertisement image 202.

In the illustrated example, the advertisement analyzer 104 obtains a number of matches threshold (block 512). For example, a user and/or an advertising entity may specify the number of matches threshold to accomplish a particular accuracy in identifying advertisements as corresponding to respective advertisement campaigns. In some examples, the advertisement analyzer 104 stores the number of matches threshold in the threshold data store 310. In the illustrated example, the advertisement analyzer 104 obtains one or more color proportion range threshold(s) 222, 224 (block 514). For example, a user and/or advertising entity may specify the first color proportion range threshold 222 to accomplish a particular accuracy in identifying advertisements as corresponding to respective advertisement campaigns. In some examples, the advertisement analyzer 104 stores the first color proportion range threshold 222 and/or the second color proportion range threshold 224 in the thresholds data store 310.

In the illustrated example, the comparator 312 compares the subset of color proportions of the first advertisement image 202 to the color proportions of the second advertisement image 204 (block 516). For example, the comparator 312 compares at least one of the color proportions of the first advertisement image 202 to a color proportion of the second advertisement image 204. In the illustrated example, the comparator 312 determines whether any of the color proportions of the first advertisement image 202 sufficiently match within the color proportion range thresholds 222, 224 to the corresponding color proportion of the second advertisement image 204 (block 518). In the illustrated example, the first color proportion range threshold 222 and/or the second color proportion range threshold 224 were previously determined at block 514 of the example process 404. In the illustrated example, if none of the color proportions of the first advertisement image 202 sufficiently matches a corresponding color proportion of the second advertisement image 204 within the respective color proportion range threshold 222, 224, the advertisement analyzer 104 determines whether to process another second advertisement 102b (block 524). If the advertisement analyzer 104 determines that another second advertisement 102b is to be processed, control returns to block 510 at which the advertisement retriever 304 retrieves another second advertisement image 204 to compare to the first advertisement image 202. If the advertisement analyzer 104 determines that another second advertisement 102b is not to be processed, the process 404 ends.

In the illustrated example, if the comparator 312 determines at block 518 that color proportions of the first advertisement image 202 sufficiently match the corresponding color proportions of the second advertisement image 204, the comparator 312 determines whether a quantity of color proportions of the first advertisement image 202 matching a quantity of color proportions of the second advertisement image 204 satisfies the number of matches threshold (block 520). For example, if the number of matches threshold is five, the comparator 312 determines whether at least five color proportions of the first advertisement image 202 match within the respective color proportions range threshold 222, 224 to the corresponding color proportions of the second advertisement image 204. In the illustrated example, if the number of matches threshold is not satisfied, the advertisement analyzer 104 determines whether to process another second advertisement 102b. If the advertisement analyzer 104 determines that another second advertisement 102b is to be processed, control returns to block 502 to retrieve another second advertisement image 204. If the advertisement analyzer 104 determines that another second advertisement 102b is not to be processed, the process 404 ends. In the illustrated example, if the comparator 312 determines that the number of matches threshold is satisfied by the first advertisement image 202 and the second advertisement image 204, the comparator 312 identifies a match between the first advertisement 102a and the second advertisement 102b (block 522) and the process 404 ends.

FIG. 6 is an illustrated example of another process to group advertisements by advertisement campaign. In the illustrated example of FIG. 6, process 600 generates reference characteristics to be used for categorizing advertisements 102 into advertisement campaign categories. Turning now to the illustrated example of FIG. 6, the advertisement retriever 304 selects an advertisement campaign (block 602). For example, the advertisement retriever 304 may retrieve one of the advertisement campaigns 110a-c of FIG. 1. Also in the illustrated example, the advertisement retriever 304 retrieves a corresponding another reference advertisement (block 604). For example, the advertisement retriever 304 may retrieve the first advertisement 102a to use as the reference advertisement from the advertisement data store 302 of FIG. 3. In some examples, the first advertisement 102a is selected as a reference for a corresponding advertisement campaign because it includes color proportions that are representative of a design theme and/or color characteristics of the corresponding advertising campaign. In some examples, the first advertisement 102a originates from a web server 110 via the Internet 106 and is stored in the advertisement data store 302. During an advertisement comparison phase (e.g., the example advertisement comparison phase of FIG. 7), candidate advertisements, such as the second advertisement 102b, are analyzed to identify advertisement campaigns to which they correspond. During such advertisement comparison phase, color proportions of candidate advertisements are compared to color proportions of the reference advertisements to determine whether the candidate advertisements belong to the same advertisement campaign as the reference advertisement.

In the illustrated example, the color analyzer 306 analyzes color properties of the reference advertisement to determine the proportions of colors in the reference advertisement image, such as the first advertisement image 202. For example, the color analyzer 306 determines pixel color values of the reference advertisement image (block 606). The example color analyzer 306 rounds the pixel color values of the reference advertisement image (block 608). For example, the color analyzer 306 rounds pixel color values of the first advertisement image 202 by dropping a number of the least significant bits of each pixel color value such that, for example, numerous shades of colors are grouped into fewer color shades.

In the illustrated example, the color proportion generator 308 determines color proportions of the reference advertisement (block 610). In the illustrated example, the color proportions generated by the color proportion generator 308 for the reference advertisement are to be used as reference color proportions which are representative of typical color proportions of a particular corresponding advertisement campaign (e.g., at least one of the advertisement campaigns 110a-c). For example, the color proportion generator 308 may identify the reference color proportions for the first advertisement 102a of a particular advertisement campaign as 20% red, 50% blue, 15% green, and 15% yellow.

In the illustrated example of FIG. 6, the color proportion generator 308 then selects a subset of the color proportions of the reference advertisement image of the reference advertisement (block 612). The selected subset is to be used to determine whether candidate advertisements (e.g., the second advertisement 102b of FIG. 2) belong to the same advertisement campaign as the reference advertisement. In the illustrated example, the color proportions selected to be part of the subset have higher proportions of presence in the reference advertisement image relative to other color proportions of the plurality of colors in the reference advertisement image. For example, the color analyzer 306 may detect 100 colors in the reference advertisement image. In such examples, the comparator 312 may identify and select the top 50 colors of the reference advertisement image having the top 50 largest color proportions. In some examples, the color proportion generator 308 sorts the color proportions of the reference advertisement image from largest to smallest to determine the top colors of the reference advertisement image.

In the illustrated example, the advertisement analyzer 104 obtains a number of matches threshold for the first advertisement 102a (block 614). In the illustrated example, the advertisement analyzer 104 obtains one or more color proportion range threshold(s) 222, 224 for the first advertisement 102a (block 616).

In the illustrated example, the associator 314 associates the selected subset of color proportions and the number of matches threshold and the color proportion range threshold (s) received at blocks 614 and 616 with the corresponding advertisement campaign (e.g., at least one of the advertisement campaigns 110a-c) of the reference advertisement (block 618). In the illustrated example, the associator 314 stores color proportion values of the selected subset of color proportions in the advertisement campaign data store 316 and stores the received thresholds in the thresholds data store 310 (block 620) in association with their corresponding advertisement campaign. Alternatively, the associator 314 stores both the color proportion values of the selected subset of color proportions and the thresholds in the advertisement campaign data store 316. In the illustrated example, the example advertisement analyzer 104 determines whether another advertisement campaign 110a-c is to be processed (block 622). If another advertisement campaign 110a-c is to be processed, control returns to block 402 to select another advertisement campaign 110a-c. If another advertisement campaign 110a-c is not to be processed, the example process 600 ends.

FIG. 7 illustrates an example process 700 to be implemented by the advertisement analyzer 104 for determining whether a candidate advertisement (e.g., the second advertisement 102b of FIG. 2) belongs to a same advertisement campaign, (e.g., one of the advertisement campaigns 110a-c of FIG. 1) as a reference advertisement (e.g., the first advertisement 102a of FIG. 2). In the illustrated example, the advertisement retriever 304 retrieves the candidate advertisement (block 702). For example, the advertisement retriever 304 may retrieve the candidate advertisement from the advertisement data store 302. Alternatively, the advertisement retriever 304 retrieves the candidate advertisement directly or from web servers 110 via the Internet 106.

In the illustrated example, the color analyzer 306 analyzes color properties of a candidate advertisement image (e.g., the second advertisement image 204 of FIG. 2) to determine the color proportions of the candidate advertisement image. In the illustrated example, the color analyzer 306 determines pixel color values of the candidate advertisement image (block 704). The example color analyzer 306 rounds the pixel color values of the candidate advertisement image (block 706).

In the illustrated example, the color proportion generator 308 then determines candidate color proportions of the candidate advertisement image (block 708). In the illustrated example, the candidate color proportions (e.g., the third color proportion 218 and the fourth color proportion 220 of FIG. 2) are representative of color proportions of the candidate advertisement image. For example, the color proportion generator 308 may identify the candidate color proportions of the candidate advertisement image 204 as 20% red, 50% blue, and 30% yellow.

In the illustrated example, the advertisement retriever 304 selects an advertisement campaign for comparison with the candidate advertisement (block 710). In the illustrated example, the selected advertisement campaign includes a reference advertisement processed by the example process 600 of FIG. 6 during the reference data generation phase to generate reference color proportions and thresholds for comparison to candidate advertisements. In this manner, the candidate color proportions can be compared to the reference color proportions to determine whether the candidate advertisement sufficiently matches the reference advertisement. If the candidate advertisement sufficiently matches to the reference advertisement, the advertisement analyzer 104 identifies that the candidate advertisement belongs to the same advertisement campaign (e.g., one of the advertisement campaigns 110a-c) as the reference advertisement.

In the illustrated example, the comparator 312 compares the candidate color proportions of the candidate advertisement image to the reference color proportions that correspond to the selected advertisement campaign of the reference advertisement (block 712). For example, the comparator 312 compares at least one of the third color proportion 218 and/or the fourth color proportion 220 of the candidate advertisement image to the reference color proportions (e.g., the first color proportion 214 and/or the second color proportion 216). In the illustrated example, the comparator 312 determines whether any of the candidate color proportions of the candidate advertisement image match within the respective color proportion range threshold 222, 224 to the corresponding reference color proportions of the selected advertisement campaign (block 714). In the illustrated example, the first color proportion range threshold 222 and/or the second color proportion range threshold 224 was previously determined at block 416 of the example process 400 during the reference data generation phase. In the illustrated example, if none of the candidate color proportions of the second advertisement image 204 matches a corresponding reference color proportion within the respective color proportion range threshold 222, 224, control returns to block 510 at which the advertisement retriever 304 retrieves another advertisement campaign (e.g., another one of the advertisement campaigns 110a-c of FIG. 1) to compare to the candidate advertisement image.

In the illustrated example, if the comparator 312 determines at block 714 that the candidate color proportions of the candidate advertisement image sufficiently match the corresponding reference color proportions of the selected advertisement campaign, the comparator 312 then determines whether a quantity of candidate color proportions matching a quantity of reference color proportions satisfies the number of matches threshold (block 716). For example, if the number of matches threshold is five, the comparator 312 determines whether at least five candidate color proportions of the second advertisement image 204 match within the respective color proportions range threshold 222, 224 to the corresponding reference color proportions. In the illustrated example, if the number of matches threshold is not satisfied at block 516, control returns to block 510 at which the advertisement retriever 304 retrieves another advertisement campaign (e.g., another one of the advertisement campaigns 110a-c) to compare with the candidate advertisement image. For example, if the number of matches threshold is five, and less than five candidate color proportions of the candidate advertisement image satisfy the respective color proportion range threshold 222, 224 the number of matches threshold is not satisfied.

In the illustrated example, if the comparator 312 determines that the candidate advertisement image satisfies the number of matches threshold, the associator 312 associates the candidate advertisement with the selected advertisement campaign (block 718). For example, if the number of matches threshold is five, and five or more color proportions of the candidate advertisement image satisfy the respective color proportion range threshold 222, 224, the candidate advertisement image satisfies the number of matches threshold. In the illustrated example, the associator 312 stores advertisement campaign association information in the advertisement campaign data store 316 (block 720). In the illustrated example, advertisement campaign association information includes information, data, and/or metadata used to tag the candidate advertisement to specify a particular advertisement campaign with which the candidate advertisement is associated.

In the illustrated example, the advertisement analyzer 104 determines if there are other advertisements 102 to be processed for association to an advertisement campaign (block 722). If there are other advertisements 102 to be processed for association to an advertisement campaign, control returns to block 502 to obtain another candidate advertisement for processing. If all advertisements 102 have been processed for associating to an advertisement campaign, the example process 700 ends.

Figure 8:
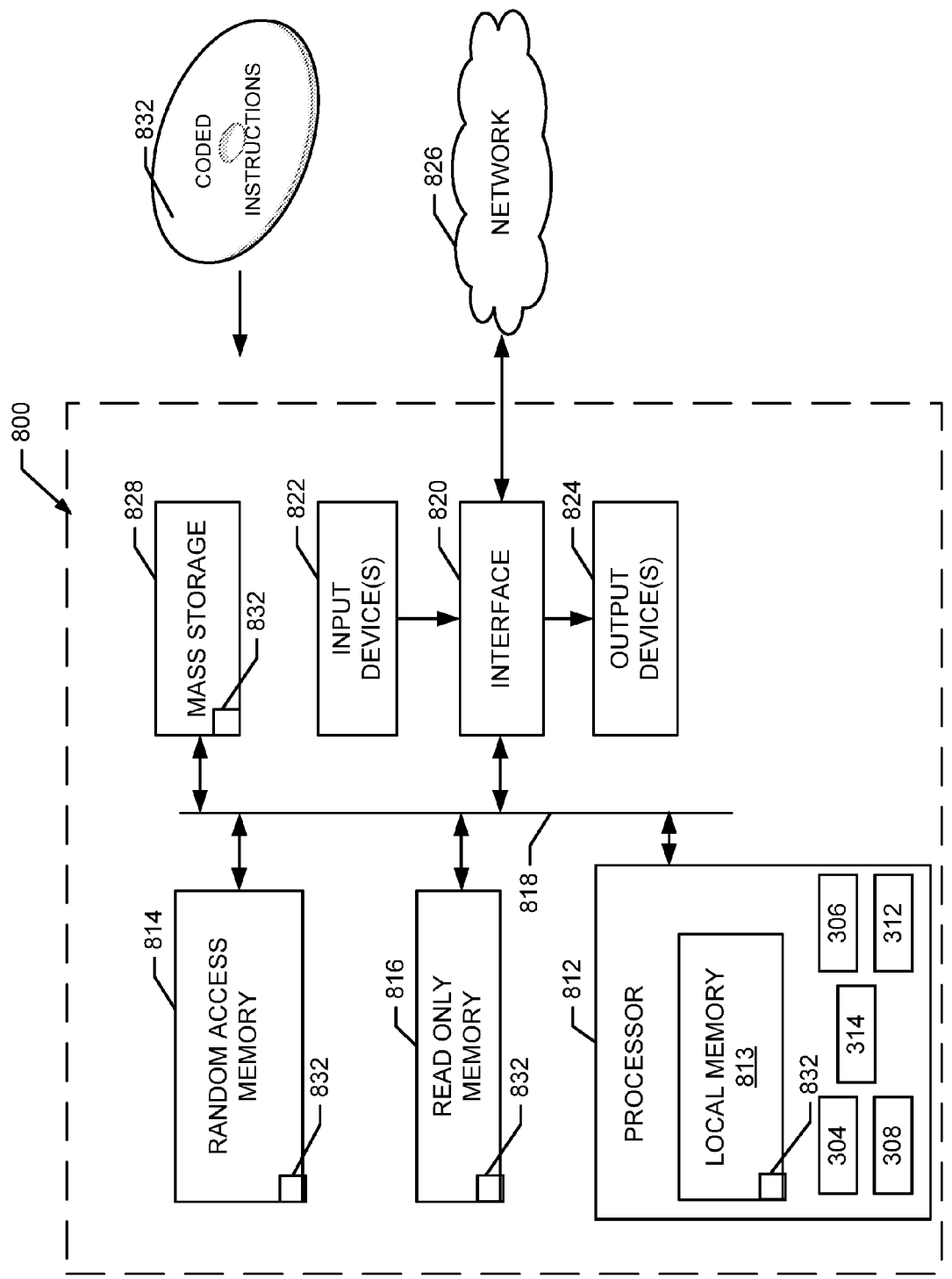
FIG. 8 is a block diagram of an example processor platform that may be used to execute the instructions of FIG. 4, FIG. 5, FIG. 6, and/or FIG. 7 to implement the example advertisement analyzer of FIGS. 1 and 3 and/or, more generally, the example system of FIG. 1.

FIG. 8 is a block diagram of an example processor platform 800 capable of executing the instructions of FIGS. 4, 5, 6, and 7 to implement the advertisement analyzer 104 of FIGS. 1 and 3. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor 812 of the illustrated example includes the example advertisement retriever 304, the example color analyzer 306, the example color proportion generator 308, the example comparator 312, and the example associator 314 of FIG. 3. In some examples, any combination of the blocks of the advertisement analyzer 104 (FIG. 3) may be implemented in the processor and/or more generally, the processor platform 800.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device (s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the example process 400 of FIG. 4, the example process 404 of FIG. 5, the example process 600 of FIG. 6, and the example process 700 of FIG. 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture enable a computing device to accurately identify advertisements as being part of particular advertisement campaigns by analyzing advertisement image properties. Disclosed examples improve a computing device's efficiency and accuracy by comparing color proportions of advertisement images to determine corresponding advertisement campaigns of advertisements. Disclosed examples also facilitate determining corresponding advertisement campaigns of advertisement images regardless of whether advertisements are of dissimilar sizes and include text in different languages. In addition, by enabling adjustability of thresholds used for analyzing advertisement images, examples disclosed herein enable the ability to balance advertisement analysis accuracy with processing resource utilization and computation time needed to process such advertisement images.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to group advertisements by advertisement campaign, comprising:

retrieving, by executing an instruction with at least one processor, pixel color values associated with first and second advertisements from a data store via a bus;

reducing computational resources associated with analyzing the pixel color values on at least one processor by dropping, by executing an instruction with the at least one processor, least significant bits from the pixel color values;

grouping, by executing an instruction with the at least one processor, first colors into a first color range and second colors into a second color range, the grouping based on colors having matching pixel color values;

determining, by executing an instruction with the at least one processor, a first color proportion corresponding to the first color range in the first advertisement and a second color proportion corresponding to the second color range in the first advertisement;

comparing, by executing an instruction with the at least one processor, the first color proportion and the second color proportion corresponding to the first advertisement to a third color proportion and a fourth color proportion corresponding to the second advertisement; and associating, by executing an instruction with the at least one processor, the second advertisement with a same advertisement campaign corresponding to the first advertisement when a similarity between the first color proportion and the third color proportion satisfies a first threshold and a similarity between the second color proportion and the fourth color proportion satisfies a second threshold.

2. The method as defined in claim 1, wherein associating the second advertisement with the same advertisement campaign of the first advertisement further includes tagging the second advertisement with metadata including an advertisement campaign identifier.

3. The method as defined in claim 1, wherein the first threshold defines a color proportion value tolerance amount different than the second threshold.

4. The method as defined in claim 1, wherein the first color range of the first color proportion sufficiently matches a color range of the third color proportion within a color range threshold and the second color range of the second color proportion sufficiently matches a color range of the fourth color proportion within the color range threshold.

5. The method as defined in claim 4, wherein the color range threshold defines a difference between a first color bit value and a second color bit value as being similar.

6. The method as defined in claim 1, further including:
    detecting a plurality of color ranges in the first advertisement;
    selecting a subset of the plurality of color ranges based on the subset of the plurality of color ranges having relatively higher proportions of presence in the first advertisement than others of the plurality of color ranges, the first color proportion and the second color proportion corresponding to two respective color ranges of the subset of the plurality of color ranges; and
    associating the first and second advertisements with a same advertisement campaign when a threshold number of color proportions in the selected subset of the plurality of color ranges detected in the first advertisement sufficiently match corresponding color proportions of the second advertisement within at least one of the first threshold or the second threshold.

7. The method as defined in claim 6, wherein the first threshold and the second threshold specify that a color proportion of the selected subset of the plurality of color ranges in the first advertisement is within a proportion range of a corresponding color proportion of the second advertisement.

8. An apparatus to group advertisements by advertisement campaign, comprising:
    an advertisement retriever to retrieve pixel color values associated with first and second advertisements from a data store via a bus;
    a color analyzer to:
        reduce computational resources associated with analyzing the pixel color values by dropping least significant bits from the pixel color values; and
        group first colors into a first color range and second colors into a second color range, the grouping based on colors having matching pixel color values;
    a color proportion generator to determine a first color proportion corresponding to the first color range in the first advertisement and a second color proportion corresponding to the second color range in the first advertisement;
    a comparator to compare the first color proportion and the second color proportion corresponding to the first advertisement to a third color proportion and a fourth color proportion corresponding to the second advertisement; and
    an associator to associate the second advertisement with a same advertisement campaign corresponding to the first advertisement when a similarity between the first color proportion and the third color proportion satisfies a first threshold and a similarity between the second color proportion and the fourth color proportion satisfies a second threshold.

9. The apparatus as defined in claim 8, wherein the associator further tags the second advertisement with metadata including an advertisement campaign identifier.

10. The apparatus as defined in claim 8, wherein the first threshold defines a color proportion value tolerance amount different than the second threshold.

11. The apparatus as defined in claim 8, wherein the first color range of the first color proportion sufficiently matches a color range of the third color proportion within a color range threshold and the second color range of the second color proportion sufficiently matches a color range of the fourth color proportion within the color range threshold.

12. The apparatus as defined in claim 11, wherein the color range threshold defines a difference between a first color bit value and a second color bit value as being similar.

13. The apparatus as defined in claim 8, wherein the color analyzer is further to detect a plurality of colors in the first advertisement and to select a subset of the plurality of colors based on the subset of the plurality of colors having relatively higher proportions of presence in the first advertisement than others of the plurality of colors, the first color proportion and the second color proportion corresponding to two respective colors of the subset of the plurality of colors.

14. The apparatus as defined in claim 8, wherein the associator associates the first and second advertisements with the same advertisement campaign when a threshold number of color proportions in a selected subset of a plurality of color ranges detected in the first advertisement sufficiently match corresponding color proportions of the second advertisement within at least one of the first threshold or the second threshold.

15. The apparatus as defined in claim 14, wherein the first threshold and the second threshold specify that a color proportion of the selected subset of the plurality of color ranges in the first advertisement is within a proportion range of a corresponding color proportion of the second advertisement.

16. An article of manufacture comprising instructions that, when executed, cause a computing device to at least:
    retrieve pixel color values associated with first and second advertisements from a data store via a bus;
    reduce computational resources associated with analyzing the pixel color values by dropping least significant bits from the pixel color values;
    group first colors into a first color range and second colors into a second color range, the grouping based on colors having matching pixel color values;
    determine a first color proportion corresponding to the first color range in the first advertisement and a second color proportion corresponding to the second color range in the first advertisement;
    compare the first color proportion and the second color proportion corresponding to the first advertisement to a third color proportion and a fourth color proportion corresponding to the second advertisement; and
    associate the second advertisement with a same advertisement campaign corresponding to the first advertisement when a similarity between the first color proportion and the third color proportion satisfies a first threshold and a similarity between the second color proportion and the fourth color proportion satisfies a second threshold.

17. The article of manufacture of claim 16, wherein the instructions further cause the computing device to tag the second advertisement with metadata including an advertisement campaign identifier.

18. The article of manufacture of claim 16, wherein the first threshold defines a different color proportion value tolerance amount than the second threshold.

19. The article of manufacture of claim 16, wherein the first color range of the first color proportion sufficiently matches a color range of the third color proportion within a color range threshold and the second color range of the second color proportion sufficiently matches a color range of the fourth color proportion within the color range threshold.

20. The article of manufacture of claim 19, wherein the color range threshold defines a difference between a first color bit value and a second color bit value as being similar.

21. The article of manufacture of claim 16, further comprising instructions that, when executed, cause the computing device to:

detect a plurality of color ranges in the first advertisement;

select a subset of the plurality of color ranges based on the subset of the plurality of color ranges having relatively higher proportions of presence in the first advertisement than others of the plurality of color ranges, the first color proportion and the second color proportion corresponding to two respective color ranges of the subset of the plurality of color ranges; and associate the first and second advertisements with the same advertisement campaign when a threshold number of color proportions in the selected subset of the plurality of color ranges detected in the first advertisement sufficiently match corresponding color proportions of the second advertisement within at least one of the first threshold or the second threshold.

22. The article of manufacture of claim 21, wherein the first threshold and the second threshold specify that a color proportion of the selected subset of the plurality of color ranges in the first advertisement is within a proportion range of a corresponding color proportion of the second advertisement.

* * * * *